W. J. TOLLERTON.
HUB LINER FOR JOURNAL BOXES.
APPLICATION FILED AUG. 13, 1917.
1,338,340.
Patented Apr. 27, 1920.
2 SHEETS—SHEET 1.
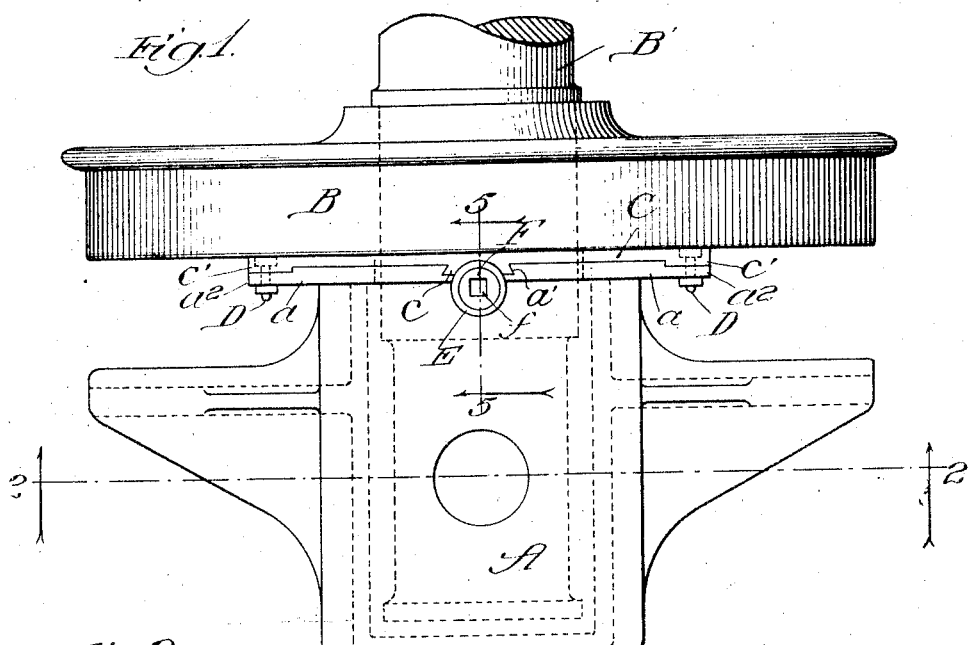
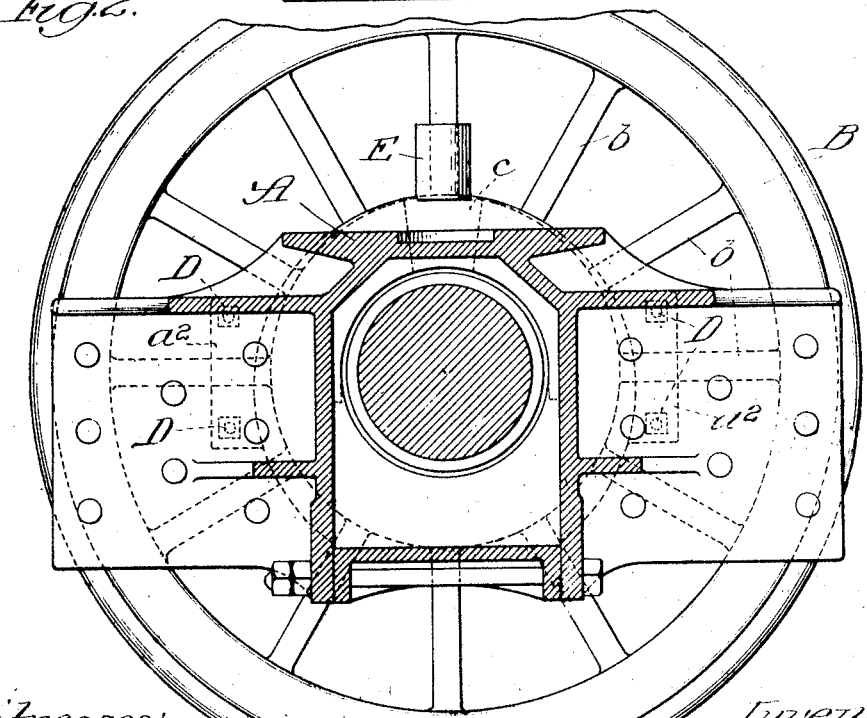
Witnesses:
Inventor:
Wm. J. Tollerton W. J. TOLLERTON.
HUB LINER FOR JOURNAL BOXES.
APPLICATION FILED AUG. 13, 1917.
1,338,340. Patented Apr. 27, 1920.
2 SHEETS—SHEET 2.
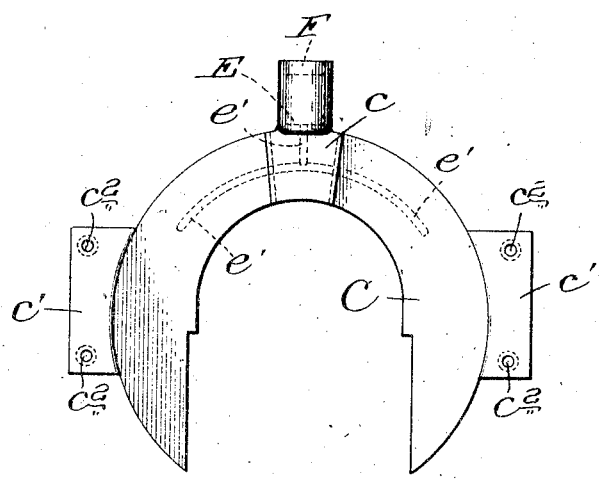
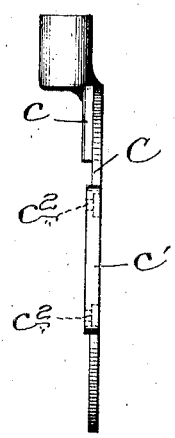
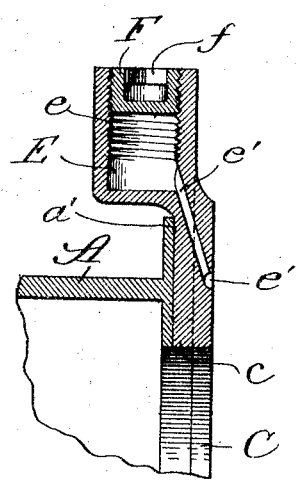

UNITED STATES PATENT OFFICE.

WILLIAM JAMES TOLLERTON, OF CHICAGO, ILLINOIS.

HUB-LINER FOR JOURNAL-BOXES.

1,338,340. Specification of Letters Patent. Patented Apr. 27, 1920.

Application filed August 13, 1917. Serial No. 185,839.

*To all whom it may concern:*

Be it known that I, WILLIAM J. TOLLERTON, a citizen of the United States, and a resident of Chicago, in the county of Cook and State of Illinois, have invented certain new and useful Improvements in Hub-Liners for Journal-Boxes, of which I do declare the following to be a full, clear, and exact description, reference being had to the accompanying drawings, forming a part of this specification.

The present invention, while designed more particularly to provide an improved construction of hub liner for various journal boxes, will be found susceptible of use as a hub liner in other situations.

The object of this invention is first to provide a hub liner that can be readily placed in or moved from its working position and when so placed will be rigidly held against danger of accidental displacement, and second, to provide a hub liner having means for insuring the effective lubrication of its wearing face and the abutting end of the hub. To this end, the invention consists in the features of improvement hereinafter described, illustrated in the accompanying drawings and particularly pointed out in the claim at the end of this specification.

Figure 1 is a plan view of a trailing truck box of a locomotive and one of the locomotive wheels, my improved hub liner being interposed between the box and the hub of the wheel. Fig. 2 is a view in vertical section on line 2—2 of Fig. 1. Fig. 3 is a detail view in elevation of my improved hub liner. Fig. 4 is a view in end elevation of the hub liner. Fig. 5 is an enlarged view in vertical section through the top of the hub liner and the upper inner end of the journal box.

Referring to the accompanying drawings, A designates the journal box, the inner end of which is shown as provided with a flange $a$, and B and B′ denote, respectively, the wheel and axle. Between the hub of the wheel B and the flange $a$ of the journal box A is placed my improved hub liner C that is united to the flange $a$ of the journal box A by a dovetail joint. The hub liner C is of yoke shape or horseshoe shape, as clearly shown in Fig. 3 of the drawings. The dovetail joint or connection between the hub liner C and the inner end of the journal box A is preferably made by forming the outer face of the hub liner C at its top with a dovetail rib $c$, this rib being preferably tapered from top to bottom, as clearly shown in Fig. 3 of the drawings, and by forming the inner face of the box flange $a$ with a correspondingly shaped dovetail groove $a'$ to receive the rib $c$. In order to more effectively and rigidly hold the hub liner C to the end of the journal box A, this liner C is formed with flanges $c'$ provided with bolt holes $c^2$, and similarly, the flange $a$ of the journal box A is formed with flanges $a^2$ having holes to receive the through bolts D that connect the hub liner to the flange $a$ of the box, and the bolt holes $c^2$ are so disposed that access to the bolts can be readily had through the openings between the spokes $b$ of the wheel B. It will thus be seen that, when the hub liner is to be placed in position for use, its dovetail ribs $c$ will be dropped into the corresponding groove $a''$ formed in the top of the box flange $a$ and the flanges $c'$ of the hub liner will be brought opposite the flanges $a^2$ of the box flange $a$. The bolts D will then be passed through the holes in the flanges $c'$ and $a^2$ and nuts will be fitted to the ends of these bolts, as clearly shown in Fig. 1 of the drawings. The hub liner will then be securely held in position for use and when it is desired to replace it, the bolts can be readily removed and the hub liner withdrawn. Obviously, the flanges $c'$ (one or more in number) can be disposed at any other desired points, although the position shown is deemed preferable; and when my invention is applied to boxes not already provided with suitable lugs to which to screw the liners, these lugs may be provided by bolting or welding on suitable extensions.

In order to secure the effective lubrication of the wearing face of the hub liner and the outer end of the wheel hub, I provide the top of the hub liner $c$ with a grease chamber E, this chamber being preferably formed as an integral part of the liner C. As shown, the interior of the grease chamber E is screw threaded, as at $e$, to receive a correspondingly threaded plug F, this plug being preferably provided with a polygonal opening $f$ to receive a key whereby the plug can be manipulated in order to expel the grease from the chamber E. From the bottom of the chamber E grease ducts or channels $e'$ lead to the wearing face of the liner C so as to effectively distribute the grease over the wearing face of the liner C and the abutting end of the wheel hub B. By advancing the plug F into the grease cavity E, grease may be forced from time to time between the wearing faces of the hub liner C and the outer end of the wheel hub.

Obviously, the precise details of construction above set out may be varied without departing from the spirit of the invention and features of the invention may be employed without its adoption as an entirety.

Having thus described my invention, what I claim as new and desire to secure by Letters Patent is:—

The combination of a journal box having laterally projecting flanges provided with bolt holes passing therethrough, and a hub liner arranged upon the inner end of said journal box, said liner being provided at its sides with laterally projecting flanges having bolt holes therein arranged to coincide with the bolt holes in the side flanges of the journal box and bolts passing through said lateral flanges of the journal box and of the hub liner and extending in the direction of the journal box and serving to firmly secure the liner to the box.

WILLIAM JAMES TOLLERTON.